US 6,728,301 B1

(12) United States Patent
Chrisikos

(10) Patent No.: US 6,728,301 B1
(45) Date of Patent: Apr. 27, 2004

(54) SYSTEM AND METHOD FOR AUTOMATIC FREQUENCY CONTROL IN SPREAD SPECTRUM COMMUNICATIONS

(75) Inventor: George Chrisikos, San Diego, CA (US)

(73) Assignees: Texas Instruments Incorporated, Dallas, TX (US); Koninklijke Philips Electronics N.V., Eindhoven (NL)

( * ) Notice: Subject to any disclaimer, the term of this patent is extended or adjusted under 35 U.S.C. 154(b) by 511 days.

(21) Appl. No.: 09/612,536

(22) Filed: Jul. 7, 2000

(51) Int. Cl.[7] .................................................. H04B 1/69
(52) U.S. Cl. ........................................ 375/147; 375/130
(58) Field of Search ................................. 375/147, 140, 375/150, 130, 148, 344; 370/335, 342, 441

(56) References Cited

U.S. PATENT DOCUMENTS

| | | | |
|---|---|---|---|
| 5,003,552 A | 3/1991 | Mower | 375/1 |
| 5,105,437 A | 4/1992 | Kingston et al. | 375/1 |
| 5,638,362 A | 6/1997 | Dohi et al. | 370/342 |
| 5,832,029 A | 11/1998 | Mimura | 375/208 |
| 5,898,665 A | 4/1999 | Sawahashi et al. | 370/342 |
| 5,913,158 A * | 6/1999 | Sullivan | 455/226.1 |
| 5,982,763 A | 11/1999 | Sato | 370/342 |
| 5,999,561 A | 12/1999 | Naden et al. | 375/206 |
| 6,047,016 A | 4/2000 | Ramberg et al. | 375/200 |
| 6,055,231 A | 4/2000 | Mesecher et al. | 370/342 |
| 6,278,725 B1 * | 8/2001 | Rouphael et al. | 375/148 |

* cited by examiner

Primary Examiner—Khai Tran
(74) Attorney, Agent, or Firm—Ronald O. Neerings; Wade James Brady, III; Frederick J. Telecky, Jr.

(57) ABSTRACT

A method is providing for calculating local oscillator phase errors in a code division multiple access (CDMA) receiver using an arctangent calculation of the difference vectors between sample stream (multipath) delays. Instead of the conventional cross-product calculation of pilot symbols, a phase correction, using both real and imaginary parts of the complex conjugate, is preformed in each sample stream delay path before the step of maximal-ratio combining (MRC). The weighted combination is then selectively filtered and accumulated, depending on whether the automatic frequency control (AFC) loop is tracking or acquiring. Then, an arctangent polynomial approximation is used to find the actual phase error. An AFC system using the above-mentioned MRC combination and arctangent calculation of phase error is also provided.

28 Claims, 3 Drawing Sheets

SYSTEM AND METHOD FOR AUTOMATIC FREQUENCY CONTROL IN SPREAD SPECTRUM COMMUNICATIONS

BACKGROUND OF THE INVENTION

1. Field of the Invention

This invention relates generally to the field of direct sequence spread spectrum (DSSS) communications and, more particularly, to a system and method for controlling a voltage controlled oscillator in the down-conversion of a frequency in a code division multiple access (CDMA) wireless receiver.

2. Description of the Related Art

In DSSS communications, such as CDMA systems, pseudorandom noise (PN) sequences are used to generate spread spectrum signals by increasing the bandwidth (i.e., spreading) of a baseband signal. A forward link waveform transmitted by the base station may be comprised of a pilot waveform and a data waveform. Both of the waveforms are received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (i) demodulating the pilot waveform, (ii) estimating the relative phase and amplitude of the pilot waveform, (iii) correcting the phase of the data waveform using the estimated phase of the pilot waveform, and (iv) adjusting the weight of data symbols used in maximal ratio combining in a RAKE receiver based on the estimated amplitude of the pilot waveform. Steps (iii) and (iv) above are performed as a "dot product" as is known in the art. In some conventional methods, a controller having a central processing unit (CPU) and and/or a digital signal processor (DSP) performs each step described, including the dot product function.

FIG. 1 illustrates a conventional IS-95 forward link base station transmitter multiplexing section 10 (prior art). A pilot channel 12 is generated that has no data. That is, the data is predetermined to be all "0" bits. The pilot channel is modulated, or covered with a Walsh code from Walsh code generator 14 at 1.2288 Mcps (megachips per second). Sixty four orthogonal Walsh codes, each of 64 bits, are used in the IS-95A and 95B systems. The IS-2000 standard uses 192 Walsh-like codes. Each channel is modulated with a unique Walsh code. Walsh code $H_0$ is used to modulate the pilot channel.

Also depicted is a traffic or paging channel, which shall be referred to herein as an information channel. Data is input at one of a plurality of data rates from 9.6 kbps (kilobits per second) to 1.2 kbps. The data is encoded at encoder 16, one bit per two code symbols, so that the output of the encoder 16 varies from 19.2 ksps (kilosymbols per second) to 2.4 ksps. Symbol repetition device 18 repeats the codes from 1 to 8 times to create a 19.2 ksps signal. Additional data rates are used in other CDMA standards. Alternately stated, either 1, 2, 4, or 8 modulation symbols are created per code symbol. Then, the information channel is scrambled with a long code at the same 19.2 ksps rate. The information channel is covered with a different Wash code from that used to cover the pilot channel, code HT for example.

After being modulated with Walsh codes, each channel is spread with a common short code, or PN sequence. Each channel is split into I and Q channels, and spread with I and Q channel PN sequences. A 90 degree phase shift is introduced by multiplying the I channels with a sin function, while the Q channel is being multiplied with a corresponding cosine function. Then, the I and Q channels are summed into a QPSK channel. In the IS-95A standard, the same baseband symbols are assigned to an I and Q quadrature. The combination of all the QPSK channels, including pilot, synchronization, paging, and traffic channels can be considered a sample stream. As a final step, the sample stream is frequency up-converted at mixer 20 with a local oscillator signal, having a local oscillator frequency, and transmitted.

FIG. 2 is a conventional IS-95 CDMA receiver (prior art). At the mobile station receiver 50 the transmitted signals are accepted as analog information, down-converted in frequency to baseband, converted into a digital sample stream at A/D 52, split into I and Q channels, multiplied respectively by sin and cosine functions to remove the 90 phase shift. Conventionally, a multi-finger RAKE receiver is used to resolve multipath variations in the sample stream, so that degradation due to fading can be minimized. Three demodulation fingers, demodulation finger 1 (54), demodulation finger 2 (56), and demodulation finger 3 (58) all receive the same I and Q sample stream. Each demodulation finger is assigned one of the sample stream multipath variations. PN codes and Walsh codes are generated with a delay consistent with the multipath delay of the sample stream to be demodulated. The sample stream from the multipaths is coherently combined in combiner 60 based on a maximal ratio combining (MRC) principle.

To effectively demodulate phase modulated signals, it is important to remove phase errors between communicating transmitters and receivers. The voltage controlled oscillator devices have inherent frequency accuracy tolerance, and tolerances due to temperature variations, which do not permit a precision open loop LO signal to be used. Further, multipath and Doppler shifts due to vehicle speed can introduce frequency errors, or frequency offsets from the transmitted frequency, into the signal as received. For example, temperature can introduce errors of +/−2 parts per million (PPM), aging can introduce +/−1 PPM per year, the process of soldering (application of IR energy) can introduce errors of +/−1 PPM, initial frequency tolerance can introduce +/−1 PPM, power supply variations can introduce +/−0.3 PPM, load variations can introduce +/−0.2 PPM, and Doppler can introduce up to +/−0.15 PPM errors into an output frequency of 2 gigahertz. Over a 3 year product life, and carrier frequency of 2 gigahertz, a +/−15 kilohertz error can result.

Thus, the LO frequency driving mixer 51 must be tracked with respect to the actual received frequency. To accomplish this frequency tracking, phase changes are measured in the demodulated pilot symbols, as these symbols have a predetermined value.

Conventionally, a frequency discriminator multiplies a present pilot symbol by previous pilot sample to convert the frequency error, the difference between the carrier signal and the LO, into a phase error. To simplify the operation, only the negative part of the imaginary part of the product is typically used for the phase error. The phase data can be used to aid in bit decisions at the demodulation finger, or used as the input to an automatic frequency control (AFC) loop to actually null out the error.

In an AFC loop the problem is further complicated by the fact that the carrier signal is received in a plurality of delays associated with multipath. Each version, or carrier signal delay may have a slightly different center frequency, or frequency offset from the other carrier signal delays.

Therefore, a correction based upon one carrier signal delay is not optimum for the others. To address this problem, the phase errors of each carrier signal delay (each multipath) are combined in a maximal-ratio combining process that weights stronger versions of carrier signal delays over more weakly received versions.

FIG. 3 is a schematic block diagram illustration of a conventional automatic frequency control system 70 (prior art). Such a system would be used to track frequency drift in the voltage controlled oscillator 72 associated with the local oscillator. It should be noted that one AFC discriminator is provided for each demodulator finger. The correction to the oscillator 72 is based on some weighted sum of locked fingers. Consequently, the error measurement E(t) is a function of an equally weighted sum of all locked demodulator fingers as follows:

$$E(t) = \{\text{function of sum of } e_i(t)\}$$

Where i=1,2,3 . . . n (demodulator finger).

The input to the frequency error detector block 74 is assumed to be estimates of the pilot channel that the finger is currently tracking. This takes advantage of the pilot estimate process done by the Channel Estimator.

The AFC loop 70 requires a frequency discriminator, a part of the frequency error detector 74, to produce an estimate of the frequency error of the signal to close the loop. The most widely used discriminator is computationally inexpensive, and is called the Cross-Product discriminator. This method is based on estimating the frequency by first obtaining an estimate of the phase, and then differentiating. The implementation only requires two multiplication operations and one addition operation. The drawback of this approach is that the resulting estimate is valid only in the tracking mode, when the frequency errors are small, and is sensitive to amplitude errors from noise and the automatic gain control (AGC) residual gain errors.

A frequency estimate is obtained by, first, determining the optimal estimate for the phase angle and, then, obtaining a frequency estimate through differentiation. The in-phase and quadrature (I and Q channel) pilot samples are expressed in rectangular coordinates after down conversion; despreading, and the complex sum and dump operations. The pilot symbol samples are expressed in rectangular coordinates by the following expressions:

$$I_k = A_k \cos \theta_k \quad (1)$$

$$Q_k = A_k \sin \theta_k \quad (2)$$

where the phase sample contains the frequency error $\Delta f$ and a constant phase term $\phi_0$ $$\theta_k = \theta(t)|_k = (2\pi \Delta f t + \phi_0)|_k. \quad (3)$$

The optimal phase estimator in the Maximum Likelihood (ML) sense can be shown to be given by:

$$\hat{\theta} = -\tan^{-1} \frac{Q_k}{I_k}. \quad (4)$$

To obtain an estimate of the frequency error, the derivative of the phase process is taken to produce:

$$2\pi \Delta f = -\frac{d}{dt} \tan^{-1} \frac{Q_k}{I_k} = \frac{\dot{I}_k Q_k - I_k \dot{Q}_k}{I_k^2 + Q_k^2}. \quad (5)$$

The dot notation in (5) is used to denote differentiation. In discrete time, the derivative of the in-phase and quadrature components can be approximated by using finite differences as follows;

$$\dot{I}_k \approx \frac{I_k - I_{k-1}}{T_s}, \text{ and } \dot{Q}_k \approx \frac{Q_k - Q_{k-1}}{T_s}. \quad (6)$$

Substituting the finite difference expression of (6) into (5):

$$2\pi \Delta f \approx \frac{I_k Q_{k-1} - Q_k I_{k-1}}{(I_k^2 + Q_k^2) T_s} \quad (7)$$

$$= \frac{A_k A_{k-1}}{A_k^2 T_s} \sin(\theta_k - \theta_{k-1}).$$

Equation (7) shows the limitation of the finite difference approximation. The approximation of the derivative by finite differences holds in the limit as the sample to sample difference is small and the sampling time goes to zero. Practically, it can be seen from the right-hand side of equation (7) that the approximation is valid for small angle differences in the phase where the sine of a small angle equals the angle itself.

The cross product discriminator performs the calculation $I_k Q_{k-1} - Q_k I_{k-1}$. This is precisely the numerator in (7). Expanding this result it follows that:

$$I_k Q_{k-1} - Q_k I_{k-1} = A_k A_{k-1} \sin(\theta_k - \theta_{k-1}) \quad (8)$$

$$\approx A_k A_{k-1} 2\pi \Delta f T_s$$

As noted above, this result gives an adequate approximation to the frequency error when the phase difference between samples is small. In many cases of interest, such as acquisition however, the phase difference will not be small, and this approximation does not hold. Another drawback to this approach is that there is a direct amplitude dependence on the frequency estimate. This may cause erroneous frequency error estimates in the feedback loop. The elimination of this amplitude dependence requires more complex processing.

It would be advantageous if a more accurate method of determining phase differences in AFC loop calculations could be devised.

It would be advantageous if phase error calculations could be made in an AFC loop for application in resolving both large and small phase errors. Likewise, it would be useful if such a calculation could be applied to frequency acquisition and tracking.

It would be advantageous if the phase error calculations for an AFC loop did not suffer from amplitude variations introduced by noise.

SUMMARY OF THE INVENTION

Accordingly, in a DSSS communications receiver, a method for automatically controlling a frequency is provided comprising: receiving a carrier signal with a plurality of corresponding delays and signal strengths; recovering pilot symbols from the plurality of carrier signal delays; calculating the phase error between the pilot symbol samples from each carrier signal delay; and, combining the phase errors, weighted with respect to the plurality of carrier signal strengths. In some aspects, a maximal-ratio weighting process is used.

As explained above, the sample stream includes a pilot channel with I and Q channel components, so that recovering the pilot symbol information includes sampling the I and Q channel components at a first and second time, in each of the plurality of sample stream delays, where a sample stream delay corresponds to a multipath variation in the arriving carrier signal. Then, calculating the phase error between pilot symbols includes taking the complex conjugate product between I and Q component samples, from first and second times, to yield a difference vector in each of the plurality of sample stream delays. The weighted combining of phase errors includes combining difference vectors from each sample stream delay to form a difference vector sum.

In a preferred aspect of the invention, following the weighted combining of difference vectors, the method further comprising finding the angle of the difference vector sum by calculating the arctangent of the difference vector sum. Selectively controlled processes of filtering and accumulation follow that make the computation applicable to either frequency tracking or frequency acquisition scenarios.

A DSSS communications receiver, automatic frequency control (AFC) system is also provided. The system comprises a down-converter circuit accepting a carrier signal with a plurality of delays and corresponding signal strengths, and providing a sample stream, with respective delays. The sample stream also including a pilot channel of pilot symbols. A plurality of demodulation fingers are also included, where each of the demodulation fingers accepts one of the sample stream delays and provides demodulated pilot symbols. Each one of a plurality of frequency discriminators accepts pilot symbols from a corresponding demodulation finger. Each frequency discriminator samples pilot symbols to provide a phase error between pilot symbols samples.

The system also includes a combiner accepting phase errors from the frequency discriminators and providing a combination of phase errors weighted with respect to the signal strength of the corresponding carrier signal delay. A complex phase block accepts the weighted combination output and provides the angle of the difference vector sum by calculating the arctangent of the difference vector sum.

DETAILED DESCRIPTION OF THE PREFERRED EMBODIMENTS

The present invention concerns a method of producing a frequency estimate that is more accurate than the conventional method explained in the Background section, which involves the use of an arctangent calculation. Despite increased complexity, the arctangent implementation is more robust and is able to operate in both acquisition and tracking modes. The estimate is independent of amplitude effects and also increases the pull-in range of the AFC.

An exact expression of the frequency error that does not suffer from small angle approximations and has no amplitude dependence is desirable. This expression is obtained by forming the complex conjugate multiplication of the quadrature samples as follows:

$$(I_k+jQ_k)(I_{k-1}+jQ_{k-1})^* = (I_k I_{k-1} + Q_k Q_{k-1}) + j(Q_k I_{k-1} - I_k Q_{k-1}) \quad (9)$$

The phase of the resulting complex sample is obtained by taking the arctangent of the ratio of the imaginary to real components. This is given by the following equation where the representations in (1) and (2) are used;

$$\tan^{-1} \frac{Q_k I_k - I_k Q_{k-1}}{I_k I_{k-1} + Q_k Q_{k-1}} = \theta_k - \theta_{k-1} \quad (10)$$
$$= 2\pi \Delta f T_s$$

This equation gives an exact expression of the frequency error which is valid for small and large angle differences. Also, there is no amplitude dependence as the amplitude component is canceled out in the division operation.

Note that the frequency discriminator takes the positive part of the complex conjugate multiplication of the kth and (k−1)th samples, as well as the imaginary. The use of only imaginary parts, as is done in convention Cross-Product discriminators leads to an incomplete answer, which can result in an inaccurate approximation. The present invention frequency discriminator uses all of more information from the two samples to form a more complete estimate.

Figure 1:
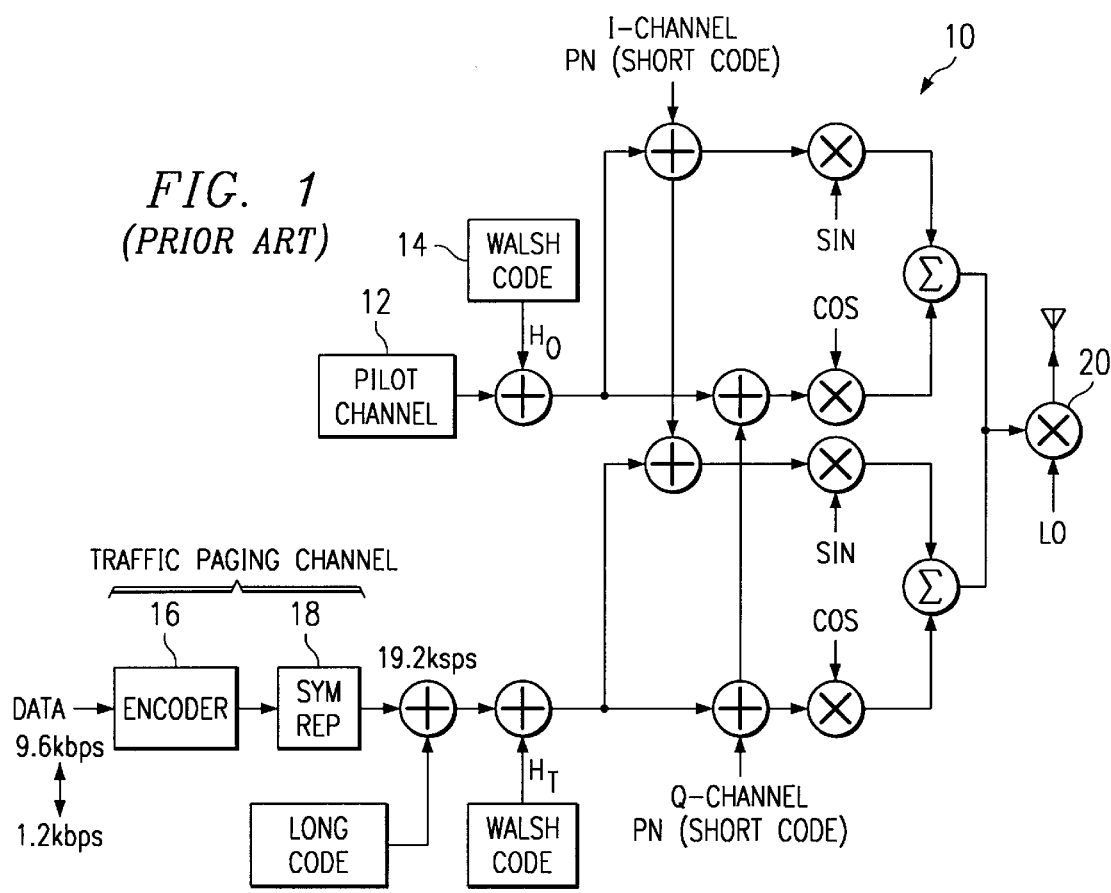
FIG. 1 illustrates a conventional IS-95 forward link base station transmitter multiplexing section (prior art).
Figure 2:
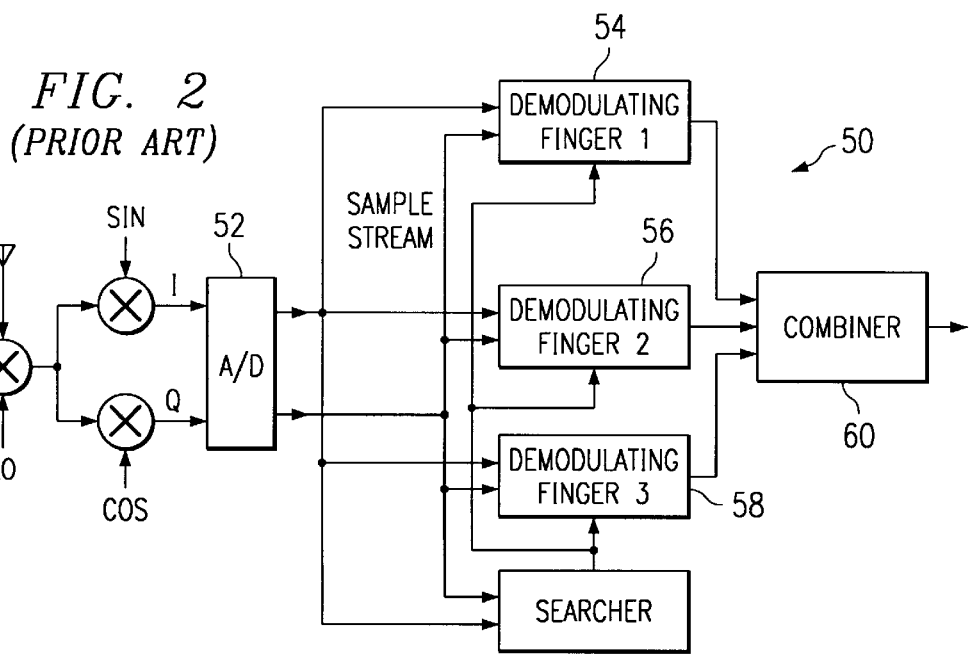
FIG. 2 is a conventional IS-95 CDMA receiver (prior art).
Figure 3:
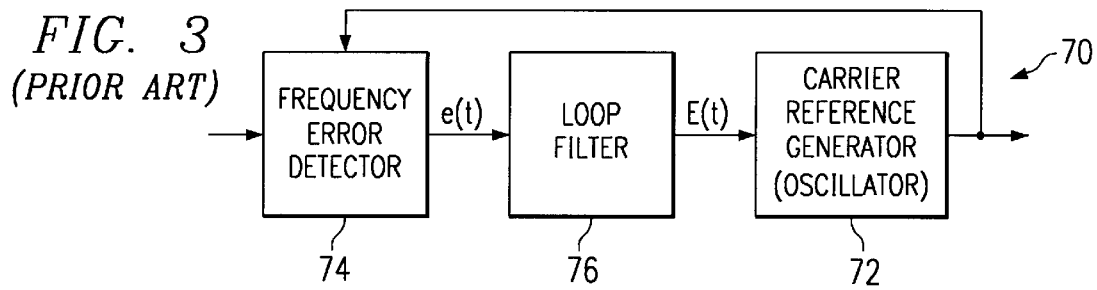
FIG. 3 is a schematic block diagram illustration of a conventional automatic frequency control system (prior art).
Figure 4A:
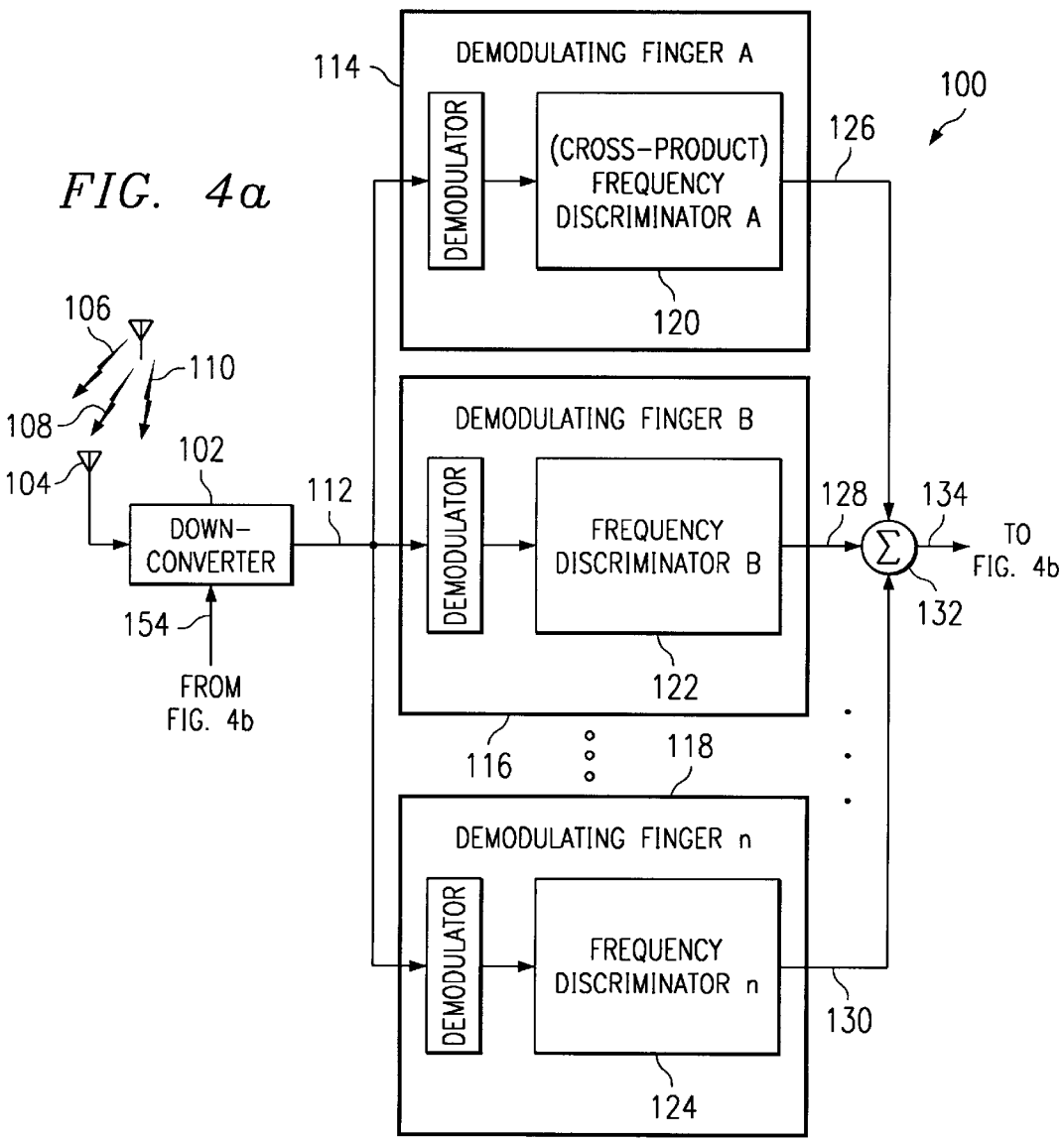
FIGS. 4a and 4b are a schematic block diagram illustrating the present invention system automatic frequency control system in a DSSS receiver.
Figure 4B:
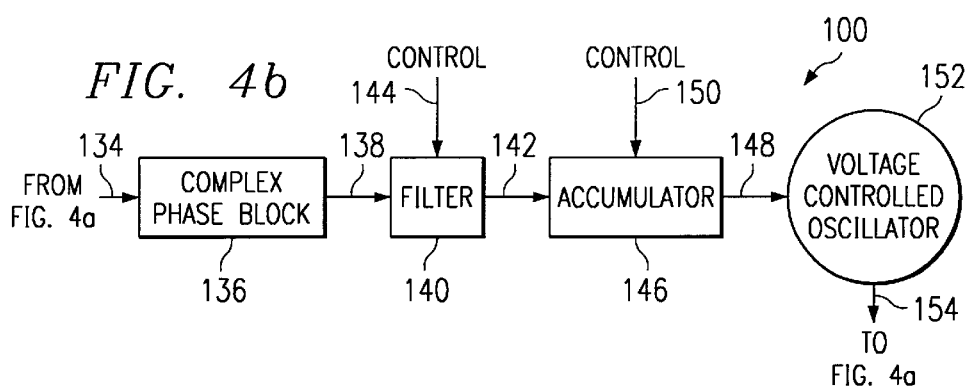

FIGS. 4a and 4b are a schematic block diagram illustrating the present invention system automatic frequency control system 100 in a DSSS receiver. A down-converter circuit 102 has an input coupled to an antenna 104 which accepts a carrier signal with a corresponding plurality of delays and signal strengths. These carrier multipath delays are schematically represented with reference designators 106, 108, and 110. Conventionally, the down-converter circuit is a mixer (not shown) which accepts the carrier at a first input, an oscillator signal at a second input, and provides a baseband product. The down-converter 102 also includes an analog to digital (A/D) conversion circuit (not shown) to provide a sample stream at the down-converter output. Further, the down-converter 102 includes sin and cosine function generators (not shown) which multiply the sample stream to create I and Q channels, which are not shown on line 112 for the sake of simplicity. The sample stream on line 112 includes a plurality of sample stream delays corresponding to respective carrier delays 106–110.

As is well understood, the sample stream on line 112 includes modulated information channels, such as traffic, synchronization, paging, and pilot channels. The sample stream is input into a plurality of demodulation fingers. Demodulation fingers A (114), demodulation finger B (116), and demodulation finger n (116) are shown, where n can be any whole number. The present invention is not limited to any particular number of demodulation fingers, however, in a preferred aspect of the invention, n=6. Each one of the demodulation fingers has an input to accept the plurality of sample stream delays. Each finger accepts, or generates PN and Walsh codes required to despread and uncover the information channels in the sample stream. The PN and Walsh codes are delayed to match one of the plurality of sample stream delays, so that each demodulator finger has an output to provide demodulated pilot symbols (from the pilot channel) corresponding to a particular sample stream delay, which ultimately translates back to a particular carrier signal multipath delay.

A plurality of frequency discriminators, frequency discriminator A (120), frequency discriminator B (122), and frequency discriminator n (124) are shown. The number of frequency discriminator equals the number of demodulation fingers in some aspects of the invention. The frequency discriminators are shown as being housed on the demodulation fingers, but they can also be external. Each has one of the plurality of frequency discriminators 120–124 has an input to accept pilot symbols from a respective demodulator finger, corresponding to a respective sample stream delay, and ultimately a respective carrier signal (multipath) delay. Each frequency discriminator 120–124 samples pilot symbols to provide a phase error between pilot symbols samples at an output, respectively on lines 126, 128, and 130.

A combiner or summer 132, has an input connected to each of the discriminator outputs on lines 126–130. Multiple combiner types are applicable for use in the invention. However, in a preferred aspect the combiner 132 is a maximal-ratio combiner (MRC). Although three inputs are shown, the present invention is not necessarily so limited. The combiner 132 has an output on line 134 to provide a combination of phase errors weighted with respect to the signal strength of the corresponding carrier signal delay. That is, the phase errors are weighted with respect to the signal strength at which various carrier multipath versions 106–110 are received at antenna 104. The strongest weighted phase error is associated with the carrier signal delay having the largest signal strength. All MRC algorithms can be used. The MRC calculation, performed before the final phase error correction, makes the invention less complicated in hardware and improves the overall signal to noise ratio of the phase error correction.

As mentioned above, the sample stream is provided to the demodulator fingers 114–118 as I and Q channels. Following demodulation of the pilot channel, the demodulator fingers 114–118 provide (demodulated) pilot symbols as I and Q channel components. Then, each frequency discriminator 120–124 multiplies complex conjugate I and Q channel samples at a first and second time, to yield a difference vector. The summer 132 combines difference vectors from each frequency discriminator 120–124 to form a difference vector sum which is provided on line 134.

The system also comprises a complex phase block 136 having an input connected to the combiner 132 on line 134. The complex phase block 136 provides the angle of the difference vector sum at an output on line 138. The complex phase block 136 provides the angle of the difference vector sum by calculating the arctangent of the difference vector sum. To speed the arctangent calculation, an approximation is made. The complex phase block 136 provides the angle (x) of the difference vector sum by approximation with a polynomial as follows:

$$\arctan(x) = a\_1 * x + a\_2 * x^3 + a\_3 * x^5$$

where $a\_1 = 0.995354$;

$a\_2 = -0.288679$; and $a\_3 = 0.079331$ $|x| < (\pi/4)$.

A fourth order approximation, or greater, can be used when greater accuracy is desired. Likewise, a second order polynomial approximation can be used when greater speed (fewer calculations) is desired. The derivation of these polynomial orders is well understood in the art.

The AFC system 100 also comprises a filter 140 having an input connected to the complex phase block 136 on line 138 to provide a filtered arctangent calculation at an output on line 142. The filter 140 has a selection input connected to line 144 to accept commands to selectively vary the filtering of the arctangent calculation as follows:

filtering the arctangent calculation with a wide bandwidth to yield a wide variance in the arctangent calculation; and filtering the arctangent calculation with a narrow bandwidth to yield a narrow variance in the arctangent calculation. It is understood that the variance in oscillator control voltage, which the arctangent calculation ultimately represents, equates to "phase noise" in the oscillator signal. A wide bandwidth filter permits the loop to acquire, but the oscillator signal is noisy, while a narrow bandwidth filter produces less phase noise in the oscillator signal.

The AFC system 100 also includes an accumulator 146 having an input connected to the filter 140 on line 142 to provide an accumulation of filtered arctangent calculations at an output on line 148. The accumulator 146 has an input on line 150 to accept commands to selectively vary the accumulation rate step size as follows:

accumulating filtered arctangent calculations with a large step size to yield a rapid acquiring and high noise variance accumulation of phase error samples; and accumulating the filtered arctangent calculations with a small step size to yield a slowly acquiring and low noise accumulation of phase error samples.

An oscillator 152 is included, typically voltage controlled, however, the present invention is not limited to any particular style of oscillator. The oscillator 152 has an input on line 148 to accept the accumulation filter arctangent calculations, and an output on line 154 connected to the down-converter oscillator input. The oscillator 152 provides an oscillator signal which is responsive to the angle of the difference vector sum (the arctangent calculation).

To complete the loop, the down-converter 102 receives the carrier signals 106–110 at approximately a first frequency with a plurality of frequency offsets corresponding to the plurality of delays. The down-converter 102 accepts the oscillator signal on line 154 at approximately a second frequency to provide a baseband sample stream signal at approximately a third frequency on line 112, which is a product of the first and second frequencies.

Figure 5:
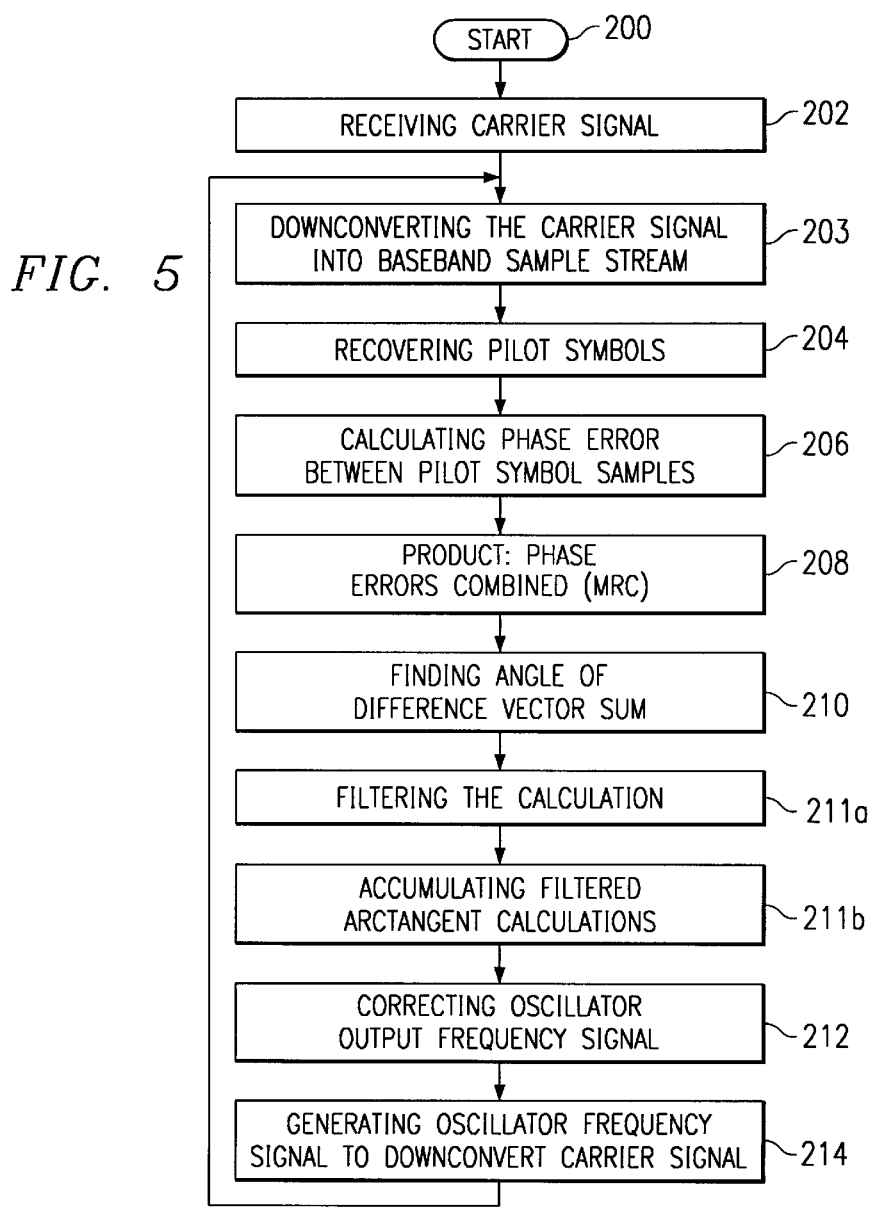
FIG. 5 is a flowchart illustrating, in a DSSS communications receiver, a method for automatically controlling a frequency.

FIG. 5 is a flowchart illustrating, in a DSSS communications receiver, a method for automatically controlling a frequency. Although the method is presented as a sequence of numbered steps for the purpose of clarity, no order should be inferred from the numbering unless explicitly stated. The method starts at Step 200. Step 202 receives a carrier signal with a plurality of delays with corresponding signal strengths. Step 204 recovers pilot symbols from the plurality of carrier signal delays. Step 206 calculates the phase error between the pilot symbol samples. Step 208 is a product, where the phase errors are combined, weighted with respect to the signal strengths of the corresponding carrier signal delays.

In some aspects of the invention, Step 203 downconverts the carrier signal into a baseband sample stream, which includes a pilot channel modulated with a Walsh code. Then, recovering pilot symbols from the carrier signal in Step 204 includes demodulating the pilot channel with a Walsh code. Further, the sample stream includes a pilot channel spread with a PN code, and recovering pilot symbols from the carrier signal in Step 204 includes despreading the sample stream pilot channel with a PN code.

In some aspects of the invention, the sample stream includes a pilot channel with I and Q channel components. Then, recovering the pilot symbols in Step 204 includes sampling the I and Q channel components at a first and second time, in each of the plurality of sample stream delays. Calculating the phase error between pilot symbols in Step 206 includes taking the complex conjugate product between I and Q component samples, from first and second times, to yield a difference vector in each of the plurality of sample stream delays. The weighted combining of phase errors in Step 208 includes combining difference vectors from each sample stream delay to form a difference vector sum.

Some aspects of the invention include further steps. Following the weighted combining of difference vectors in Step 208, Step 210 finds the angle of the difference vector sum. The finding the angle of the difference vector sum in Step 210 includes calculating the arctangent of the difference vector sum, wherein the angle (x) of the difference vector sum is approximated with a polynomial as follows:

$$\arctan(x) = a\_1 * x + a\_2 * x^3 + a\_3 x^5$$

where a_1=0.995354;
a_2=-0.288679; and
a_3=0.079331
$|x| < (\pi/4)$.

In some aspects of the invention, receiving the carrier signal in Step 202 includes the carrier signal having approximately a first frequency with the plurality of frequency offsets corresponding to the plurality of carrier signal delays (multipath). Step 212, in response to finding the angle of the difference vector sum, corrects a (voltage controlled) oscillator output frequency signal to substantially match the carrier signal frequency offset having the largest signal strength. The MRC principle is applied in a preferred aspect of the invention. A further step, Step 214 generates the oscillator frequency signal to downconvert the carrier signal.

In some aspects of the invention a further step, Step 211a, following the finding of the angle of the difference vector sum, filters the calculation to yield a filtered arctangent calculation. The filtering of the angle of the difference vector sum calculation in Step 211a includes selectively varying the filtering of the arctangent calculation as follows:

filtering the arctangent calculation with a wide bandwidth to yield a wide variance in the arctangent calculation; and filtering the arctangent calculation with a narrow bandwidth to yield a narrow variance in the arctangent calculation.

In some aspects of the invention a further step, Step 211b, following the filtering of the arctangent calculation in Step 211a, accumulates the filtered arctangent calculations. The accumulating of filtered arctangent calculations in Step 211b includes selectively varying the accumulation rate step size as follows:

accumulating filtered arctangent calculations with a large step size to yield a rapid acquiring and high noise variance accumulation of phase error samples; and accumulating the filtered arctangent calculations with a small step size to yield a slowly acquiring and low noise accumulation of phase error samples.

A method is providing for calculating local oscillator phase errors in a code division multiple access (CDMA) receiver using an arctangent calculation of the difference vectors between sample stream (multipath) delays. A complex conjugate product calculation, using real and imaginary components, of pilot symbols is preformed in each sample stream delay path before the step of combining. The weighted combination is then selectively filtered and accumulated, depending on whether the automatic frequency control (AFC) loop is in the tracking or acquisition state. Then, an arctangent polynomial approximation is used to find the actual phase error. An AFC system using the above-mentioned MRC combination and arctangent calculation of phase error is also provided. Although the invention is exemplified using two quadrant resolution, the invention is also applicable to the resolution of four quadrant phase detection. Other embodiments and variations will occur to those skilled in the art.

What is claimed is:

1. In a direct sequence spread spectrum (DSSS) communications receiver, a method for automatically controlling a frequency comprising:

receiving a carrier signal with a plurality of delays and corresponding signal strengths;

recovering pilot symbols from the plurality of carrier signal delays;

calculating a phase error between the pilot symbols;

weighting the phase errors with respect to the signal strengths of the corresponding carrier signal delays;

combining the weighted phase errors; and in response to combining the weighted phase errors, correcting a signal frequency.

2. The method of claim 1 further comprising:

converting the carrier signal with the plurality of delays into a sample stream with a plurality of delays, the sample stream including a pilot channel modulated with a Walsh code; and wherein:

recovering pilot symbols from the carrier signal includes demodulating the pilot channel with a Walsh code.

3. The method of claim 1 in which the sample stream includes a pilot channel spread with a PN code; and wherein:

recovering pilot symbols from the carrier signal includes despreading the sample stream pilot channel with a PN code.

4. The method of claim 2 in which the sample stream includes a pilot channel with I and Q channel complex conjugate components; and wherein:

recovering pilot symbols includes sampling the I and Q channel complex conjugate components at a first and at a second time, in each of the plurality of sample stream delays; and calculating the phase error between pilot symbols includes multiplying complex conjugate I and Q samples taken at the first and second times, to yield a difference vector in each of the plurality of sample stream delays; and combining the weighted phase errors includes combining difference vectors from each sample stream delay to form a difference vector sum.

5. The method of claim 4 further comprising:

following the weighted combining of difference vectors, finding an angle of the difference vector sum.

6. The method of claim 5 wherein:

finding the angle of the difference vector sum includes calculating an the arctangent of the difference vector sum.

7. The method of claim 6 wherein:

finding the angle includes finding the angle (x) of the difference vector sum approximated with a polynomial as follows:

$$\text{Arctan}(x) = a\_1*x + a\_2*x^3 + a\_3x^5$$

where $a\_1 = 0.995354$;

$a\_2 = -0.288679$;

$a\_3 = 0.079331$; and $|x| < (\blacktriangleright/4)$.

8. The method of claim 5 wherein:

receiving the carrier signal includes the carrier signal having a first frequency with a plurality of frequency offsets corresponding to the plurality of carrier signal delays; and the method further comprising:
generating an oscillator signal to downconvert the carrier signal; and
wherein correcting the signal frequency includes correcting the oscillator signal to match a carrier signal frequency offset having the largest signal strength, in response to finding the angle of the difference vector sum.

9. The method of claim 8 further comprising:

following the finding of the angle of the difference vector sum, filtering the calculation of the phase angle to yield a filtered phase error sample.

10. The method of claim 9 wherein:

filtering of the angle of the difference vector sum calculation includes selectively varying the filtering of the arctangent calculation as follows:
filtering the arctangent calculation with a wide bandwidth to yield a wide variance in the arctangent calculation; and
filtering the arctangent calculation with a narrow bandwidth to yield a narrow variance in the arctangent calculation.

11. The method of claim 9 further comprising:

following the filtering of the angle of the difference vector sum calculation, accumulating the filtered phase error samples.

12. The method of claim 11 wherein:

accumulating filtered phase error samples includes selectively varying an accumulation rate step size as follows:
accumulating filtered arctangent calculations with a large step size to yield a rapid acquiring and high noise variance accumulation of phase error samples; and
accumulating the filtered arctangent calculations with a small step size to yield a slowly acquiring and low noise accumulation of phase error samples.

13. The method of claim 11 further comprising:

generating the oscillator signal in response to the accumulated phase error samples.

14. The method of claim 1 wherein the combining of phase errors includes combining the phase errors in a maximal-ratio combination (MRC) process.

15. In a direct sequence spread spectrum (DSSS) communications receiver, an automatic frequency control (AFC) system comprising:

a down-converter circuit having an input to accept a carrier signal with a plurality of delays and corresponding signal strengths, and an output to provide a sample stream, with respective delays, the sample stream including pilot symbols;

a plurality of frequency discriminators, each one of the plurality of frequency discriminators having an input to accept pilot symbols from a corresponding one of the plurality of sample stream delays, each frequency discriminator sampling pilot symbols to provide a phase error between the pilot symbols at an output; and a combiner having an input connected to each of the discriminator outputs, the combiner having an output to provide a combination of phase errors, weighted with respect to the corresponding plurality of carrier signal strengths.

16. The system of claim 15 wherein the down-converter provides a sample stream including a modulated pilot channel; and the system further comprising:
a plurality of demodulation fingers, each one of the plurality of demodulation fingers having an input to accept a corresponding one of the plurality of sample stream delays, and an output connected to a corresponding on of the plurality of frequency discriminator inputs to provide demodulated pilot symbols.

17. The method of claim 16 wherein the down-converter provides a sample stream including a spread pilot channel; and wherein each one of the demodulation finger provides despread pilot symbols.

18. The method of claim 17 wherein each demodulation finger provides pilot symbols as I and Q channel complex conjugate components;

wherein each frequency discriminator multiplies complex conjugate I and Q samples at a first and at a second time, to yield a difference vector; and wherein the combiner combines difference vectors from each frequency discriminator to form a difference vector sum.

19. The system of claim 18 further comprising:

a complex phase block having an input connected to the combiner output, to provide an angle of the difference vector sum at an output.

20. The system of claim 19 wherein the complex phase block provides the angle of the difference vector sum by calculating an arctangent of the difference vector sum.

21. The system of claim 20 wherein the complex phase block provides the angle (x) of the difference vector sum by approximation with a polynomial as follows:

$$\text{Arctan}(x) = a\_1*x + a\_2*x^3 + a\_3x^5$$

where $a\_1 = 0.995354$;

$a\_2 = -0.288679$; and $a\_3 = 0.079331$ $|x| < (\blacktriangleright/4)$.

22. The system of claim 21 wherein the down-converter receives the carrier signal having a first frequency with a plurality of frequency offsets corresponding to the plurality of carrier signal delays, and wherein the down-converter accepts an oscillator signal at approximately a second frequency to provide a sample stream at a third frequency product of the first and second frequencies, and the system further comprising:
a voltage controlled oscillator having an input coupled to the complex phase block output, and an output connected to the down-converter to provide the oscillator signal which is responsive to the angle of the difference vector sum.

23. The system of claim 22 further comprising:

a filter having an input connected to the complex phase block output, to provide a filtered arctangent calculation at an output coupled to the voltage controlled oscillator input.

24. The system of claim 23 wherein the filter has a selection input to accept commands to selectively vary the filtering of the arctangent calculation as follows:

filtering the arctangent calculation with a wide bandwidth to yield a wide variance in the arctangent calculation; and filtering the arctangent calculation with a narrow bandwidth to yield a narrow variance in the arctangent calculation.

25. The system of claim 23 further comprising:

an accumulator having an input connected to the filter output, to provide an accumulation of filtered arctangent calculations at an output connected to the voltage controlled oscillator input.

26. The system of claim 25 wherein the accumulator has an input to accept commands to selectively vary an accumulation rate step size as follows:

accumulating filtered arctangent calculations with a large step size to yield a rapid acquiring and high noise variance accumulation of phase error samples; and accumulating the filtered arctangent calculations with a small step size to yield a slowly acquiring and low noise accumulation of phase error samples.

27. The system of claim 15 wherein the combiner is a maximal-ratio combiner (MRC).

28. In a direct sequence spread spectrum (DSSS) communications receiver, an arctangent method for automatically controlling a frequency comprising:

receiving a carrier signal with a plurality of delays and corresponding signal strengths;

recovering pilot symbols from the plurality of carrier signal delays;

calculating a phase error between the pilot symbol;

weighting the phase errors with respect to the signal strength of the corresponding carrier signal delays;

combining the weighted phase errors;

calculating an arctangent of the phase error combination; and in response to the arctangent calculation, correcting a signal frequency.

* * * * *